United States Patent Office 2,791,569
Patented May 7, 1957

2,791,569

COATING COMPOSITIONS CONTAINING A HEART-CUT PARAFFIN WAX AND A POLYOLEFIN

Peter Stanley Backlund, Anaheim, Calif., assignor to Union Oil Company of California, Los Angeles, Calif., a corporation of California No Drawing. Application February 24, 1953,
Serial No. 338,571

7 Claims. (Cl. 260—28.5)

This invention relates to paraffin wax compositions and methods of making them and particularly to such compositions which are suitable for coating paper, paper cartons and similar materials. More particularly, the invention relates also to wax compositions containing an agent to improve the sealing strength of the composition.

Paraffin waxes have been used for coating paper cartons and for coating food wrapping paper, such as bread wrapping paper and the like, in order to produce cartons and paper which are impervious to air and moisture, thus permitting the use of such coated materials as containers and/or wrappers for food products. One of the advantages of using a coating, such as is obtainable by impregnating or coating the paper or cardboard material with paraffin wax, is that packages may be sealed without the use of glue or adhesive materials other than the coating materials themselves. It has been found, however, that papers coated with ordinary paraffin wax or even with paraffin wax containing various materials, as for example polyethylene, designed to improve the sealing strength of the paraffin wax, when sealed by the use of heat and pressure do not give a seal having sufficient strength for many purposes. Attempts have been made to improve the sealing strength of paraffin waxes by incorporating not only materials of the character of polyethylene, but also by incorporating small amounts of petrolatum or amorphous type waxes and although it has been found that the amorphous wax does improve the sealing strength in some instances, the improvement is not generally sufficient to produce a composition having desirably high sealing strength.

Applicant has found that by the proper selection and preparation of the paraffin wax to be employed as a coating material it is possible to obtain a wax having high sealing strength per se and that by adding small amounts of a polyolefin, as for example polyethylene, to the paraffin wax so produced it is possible to obtain a wax suitable for coating which has exceptionally high sealing strength characteristics. Thus, it is found that a particular fraction of paraffin wax obtained in a certain manner from waxes normally recovered in the refining of petroleum, has unusually high sealing strength and more importantly this paraffin wax appears to be outstandingly more susceptible to improvement in sealing strength characteristics by the incorporation of small amounts of polyolefins than are ordinary paraffin waxes.

Thus, it is an object of this invention to prepare a paraffin wax having high sealing strength and other characteristics making it suitable for use in coating paper, paper cartons and the like.

It is another object of this invention to prepare a paraffin wax composition containing small amounts of polyolefins, which composition has exceptionally high sealing strength and possesses other characteristics making it suitable for coating paper and paper containers.

A more specific object of this invention is to produce a paraffin wax which is unusually susceptible to improvement of sealing strength characteristics by the incorporation in said wax of small amounts of polyolefins.

A particular object of this invention is to prepare a coating composition having high sealing strength and being suitable for use in coating food wrapping paper and paper cartons, which composition contains a particular paraffin wax fraction and a small amount of polyethylene.

Other objects will be apparent as the description of the invention proceeds.

It is found that a particular heart-cut paraffin wax which is obtained by deoiling and distilling a slack wax has unusually high sealing strength and, when blended with small amounts, as for example 0.5% to 5% and preferably about 3% of a polyolefin, e. g., polyethylene, results in a product having outstandingly high sealing strength. To obtain the particular heart-cut paraffin wax, the slack wax may be deoiled and the deoiled wax distilled or preferably the slack wax is distilled and the heart-cut then deoiled to obtain the desired heart-cut paraffin wax. In either case, in the distillation, at least the first 40% overhead is discarded, and suitable heart-cut waxes are produced when the first 40% to 60% and preferably the first 50% overhead distillate is discarded. The distillation is then continued until not more than 30% of the bottoms remains. Suitable heart-cut waxes are obtained when the proportion of bottoms remaining is between 5% and 30% and preferably between 10% and 20% of the wax being distilled. The heart-cut thus recovered will consist of distillate wax within the maximum range of the 40% to 95% fraction of the wax being distilled. The narrowest heart-cut will be the 60% to 70% fraction and preferably the heart-cut will not be narrower than the 50% to the 80% fraction. The slack wax is preferably one recovered by ordinary dewaxing operations from a waxy crude oil which has been topped to remove fractions up to and including gas oil. The resulting deoiled and distilled heart-cut which will contain less than about 1% and preferably less than about 0.5% oil and will have a melting point between about 150° F. and 170° F. depending upon the crude oil from which the wax was obtained and upon the particular range of the heart-cut fraction. This heart-cut fraction is found to have a sealing strength of at least about 20 and often as high as 30. On adding 3% of polyethylene of about 12,000–13,000 molecular weight, this wax will have a sealing strength of approximately 90 which is a strength approximately equal to the tearing strength of paper normally employed as bread wrapping paper. Thus, when paper is coated with a wax composition of this type, the sealing strength is as great as the strength of the paper itself.

The term "sealing strength" as used in this description is that weight in grams per linear inch of seal required to separate, at a standard pulling rate, two pieces of coated paper which have been heat-sealed under standard conditions. This value is determined in a machine having a calibrated spring, the elongation of which is observed during the period of test, which spring is attached to one sheet of paper forming the seal and a means for pulling the second sheet of paper forming the seal at a constant rate so as to give a stripping rate of approximately 3.0 mm. per second. The force required to separate the seal at the rate indicated is reported in grams per linear inch of seal. The test sample is prepared by coating two sheets of standard bread wrapping paper by dipping the paper in a bath containing the wax or wax composition to be used for coating and passing the coated paper over heated rolls to remove excess wax. The coated paper is permitted to cool to room temperature and is then sealed under standard conditions. Two pieces of the coated paper are heat-sealed at a temperature of 250° F. by pulling them over a hot plate maintained at this temperature under a load approximately 500 grams per linear inch of seal at a rate of about 0.65 meters per minute. Following this treatment the sealed paper is cut into strips 1 inch or 2 inches wide and these strips are then evaluated in the sealing strength test. Where the sealing strength is high it is preferable to employ strips 1 inch wide, however, where the sealing strength is relatively low, i. e., of the order of 20 grams or less, 2 inch strips give more reproducible results in the sealing strength test.

The paraffin waxes of this invention may be obtained from substantially any waxy crude oil by appropriate treatment. Thus, waxes having the characteristics of those described herein are obtained from waxy California crudes, Midcontinent crudes and Pennsylvania crude oils. The method of separating the desirable fraction is substantially the same in each instance and the following description of the preparation of a desirable paraffin wax fraction from a waxy California crude will serve to illustrate one method which is applicable with minor modifications, to any waxy crude oil. In the following process it is to be pointed out that it is not essential that the topped crude oil be solvent treated prior to dewaxing. Moreover, where desirable the topped crude may simply be deasphalted by methods well known in the art.

A typical California waxy crude oil is topped to remove fractions up to and including gas oil, leaving the fractions normally referred to as lubricating oil fractions as a residue. The resulting topped oil is extracted with a selective solvent designed to remove as extract the more aromatic portion of the oil. The raffinate from the solvent extraction operation is then dewaxed by any of the well known commercial dewaxing methods. Particularly satisfactory results are obtained by dewaxing using propane as the dewaxing solvent. The wax thus obtained, which is known as slack wax, contains 20% to 35% of oil depending upon the source and the particular method employed in the dewaxing operation. It is this slack wax which is distilled, preferably under vacuum, as for example at a pressure of 1.0 mm., and a heart-cut consisting of the 50% to 90% fraction of the original charge is separately collected. This heart-cut is then deoiled using standard deoiling methods at temperatures between 50° F. and 85° F. and preferably at about 70° F. Particularly satisfactory results are obtained using methyl ethyl ketone or methyl isobutyl ketone as the deoiling solvent. It is desirable to operate under conditions such that the deoiled wax has an oil content less than about 0.5% by weight although 1% oil is not too objectionable. The melting point of this deoiled wax will be between 150° F. and 170° F. and generally between 155° F. and 160° F.

A product of substantially the same characteristics is obtained by first deoiling the slack wax using ordinary deoiling methods and then distilling the deoiled wax to recover the 50% to 90% fraction. This method of operation is generally more difficult to carry out since it is observed that the tendency toward cracking during distillation is greater with the deoiled wax.

In preparing the heart-cut of the slack wax, although it has been indicated that the cut may include the 40% to 95% fraction, a 50% to 90% fraction is preferred in that it is the broadest fraction which gives the highest sealing strength. However, 40% to 70% fractions appear to be satisfactory and when blended with polyolefins give compositions of high sealing strength, i. e., values approaching 90. Where the upper end of the fraction is below about 70%, the advantages of high sealing strength are not obtainable. Thus, a heat-cut consisting of the 40% to 65% fraction of slack wax, after deoiling had a sealing strength of 8 and on blending with 3% polyethylene had a sealing strength of only about 15.

Generally, the sealing strength of the heart-cut wax fraction is between about 20 and about 30 as compared with values of 5 to 15 for most paraffin wax fractions or blends of paraffin wax fractions with amorphous waxes. Moreover, the deoiled heart-cut wax fraction of this invention containing 3% polyethylene of 12,000–13,000 molecular weight, for example, will have a sealing strength of 90, as compared with sealing strengths of 15 to 20 for most commercial paraffin waxes containing 3% of the polyethylene or blends of such waxes with amorphous waxes which contain also 3% of polyethylene.

The method of incorporating polyethylene or other polyolefin into the paraffin wax of this invention appears to have some effect on the sealing strength of the compositions produced. Thus, unless the polyolefin is well dispersed its effectiveness is not as great as when complete dispersal is obtained. A method which has been found entirely satisfactory consists in heating polyethylene, for example, to a temperature in the range of 315–350° F. until it softens and then adding small increments of paraffin wax and mixing them into the softened polymer. This incremental addition and mixing is continued until about 5 parts of wax to one part of polymer have been incorporated. The resulting mass, when cooled to temperatures of about 170° F., appears to precipitate the polymer so that it is preferable to maintain the polymer concentrate at a temperature at least as high as 200° F. until it is added to and mixed with the total amount of paraffin wax with which it is to be incorporated. The resulting wax product, which may contain from approximately 0.5% to about 5% by weight of the polymer, when cooled to room temperature, generally shows slight cloudiness, however, separation of polymer in the wax does not appear to be very great.

Polyolefins to be employed include the polyethylenes, polypropylenes and polybutylenes of approximately 8,000 to approximately 20,000 molecular weight. These polymers have the effect of greatly increasing sealing strength of the heart-cut paraffin waxes of this invention. The polyethylenes are the preferred polyolefins and polyethylene of 12,000-13,000 molecular weight is particularly preferred.

The following examples will serve to illustrate the invention.

*Example 1*

A paraffin wax suitable for use in preparing compositions of this invention was prepared from a waxy California crude oil in the following manner. A waxy California crude having an A. P. I. gravity of 33.0 was distilled at a pressure of approximately 1.0 mm. to a temperature of 225° F. in order to remove all fractions up to and including gas oil. The residual crude oil was then solvent-treated using a conventional method of solvent treatment with a commercial extractive solvent. The raffinate from this extraction had an A. P. I. gravity of 30.5 and a Saybolt Universal viscosity at 210° F. of 61.

The raffinate was dewaxed using propane as the solvent at a temperature of —40° F. The slack wax thus obtained, amounting to approximately 35.0% by weight of the residual lubricating oil fraction, had a melting point of 145° F. and contained approximately 25% by weight of oil.

This slack wax was distilled and separated into three overhead cuts leaving one residual fraction. The first overhead cut consisted of the 0.0 to 25% fraction, the second the 25 to 50% and the third the 50 to 90% fraction, leaving approximately 10% by weight of the original slack wax as bottoms.

Each of the overhead fractions and the bottoms fraction were deoiled at 70° F. using methyl isobutyl ketone as the deoiling solvent and following conventional deoiling procedures. The deoiled fractions had the following characteristics:

| Fraction, Percent | Melting Point, °F. | Oil Content, Percent by Weight |
|---|---|---|
| 0–25 | 130 | 0.09 |
| 25–50 | 143 | 0.04 |
| 50–90 | 158 | 0.10 |
| Bottoms | 174 | 0.50 |

*Example II*

The 50–90% fraction obtained in Example I was used in the preparation of coating compositions using 1%, 3% and 5%, respectively, of polyethylene of 12,000–13,000 molecular weight. The polyethylene was incorporated in the wax in the manner described hereinabove. Bread wrapping paper was then coated with each of the three coating compositions prepared, and, for comparison, with the 50–90% fraction without added polyethylene. Strips of the paper were passed through a bath containing the coating composition maintained at a temperature of 250° F. and following removal from the bath the coated paper was passed over steam heated rollers to remove excess wax from the paper. After cooling to room temperature strips of the coated paper were sealed by passing the paper over a hot plate maintained at approximately 250° F.; the sealing being effected by applying a weight to a roller resting on the paper strips as they passed over the hot plate, the weight applied being approximately 500 grams per linear inch of seal. The sealed paper was then cut into 1 inch strips 6 inches long for testing. In each instance three samples were tested and the results reported in the following tables are averages of the results obtained in the three tests.

| Coating Composition | Sealing Strength, grams/linear inch |
|---|---|
| 50–90% Cut | 20 |
| 50–90% Cut + 1% Polyethylene | 50 |
| 50–90% Cut + 3% Polyethylene | 90 |
| 50–90% Cut + 5% Polyethylene | a 90+ | a The paper tears at approximately 90 grams per linear inch, so that sealing strengths above this point are not determinable with the paper employed.

*Example III*

For purposes of comparison with the above results, sealing strength tests were made on various commercial paraffin waxes, on mixtures of various commercial paraffin waxes and amorphous or micro-crystalline waxes, and on these various compositions containing 3% by weight of polyethylene. Samples were prepared in the same manner as described in Example II and the sealing strength tests were made in the same manner except that in some instances 2 inch wide strips were used in order to obtain more reproducible results.

| Coating No. | Composition | Sealing Strength, grams/linear inch |
|---|---|---|
| 1 | Paraffin Wax, 143–150° F. M. P. | 8 |
| 2 | Coating No. 1+3% Polyethylene | 15 |
| 3 | Coating No. 2+10% amorphous wax, 150° F. M. P. | 18 |
| 4 | Deoiled 0–25% cut from Example I+10% deoiled bottoms from Example I | 8 |
| 5 | Coating No. 4+3% Polyethylene | 17 |
| 6 | Deoiled 25–50% cut from Example I+10% deoiled bottoms from Example I | 10 |
| 7 | Coating No. 6+3% Polyethylene | 32 |

*Example IV*

A slack wax prepared as described in Example I was distilled to obtain a 0–40% cut, a 40–95% cut and a bottoms fraction. The 40–95% cut was deoiled and 3% of polyethylene of 12,000–13,000 molecular weight was incorporated in the wax. This composition had a sealing strength of 90.

*Example V*

A slack wax prepared as described in Example I was distilled to obtain a 45–70% heart-cut fraction. This fraction was deoiled and 3% of polyethylene of the type used in Example IV was incorporated. The resulting composition had a sealing strength of 90.

*Example VI*

A Pennsylvania crude oil was topped to remove fractions up to and including the gas oil fraction and the residuum was dewaxed by conventional methods to obtain a slack wax having a melting point of 120° F. and containing approximately 25% of oil. The slack wax was distilled and a 50–90% heart-cut recovered. This heart-cut was deoiled to obtain a product having a melting point of 138° F. and containing 0.5% oil. This wax when applied to bread wrapper paper had a sealing strength of 20 and when 3% by weight of polyethylene was added the resulting coating material had a sealing strength of 90.

In a second distillation a heart-cut consisting of the 60% to 80% fraction was recovered. This fraction, after deoiling, had sealing strength of 28 and upon the addition of 2% polyethylene had a sealing strength of 90.

*Example VII*

A slack wax obtained from California waxy crude oil as described in Example I was deoiled at 70° F. using methyl ethyl ketone as the deoiling solvent. The deoiled wax was distilled under vacuum and a heart-cut consisting of the 55% to 85% fraction was recovered. This product had a melting point of 159° F., contained 0.2% of oil and had a sealing strength of 25.

Separate portions of this wax were compounded with 3% based on the wax of polyethylenes of different molecular weight and with a polybutylene. Bread wrapping paper was coated with each of the compositions and sealing strengths were determined. The results of these tests are shown in the following tabulation:

| Coating No. | Composition | Sealing Strength, grams/linear inch |
|---|---|---|
| 1 | 55–85% heart-cut | 25 |
| 2 | Coating No. 1+3% Polyethylene 12,000 molecular weight | 90+ |
| 3 | Coating No. 1+3% Polyethylene 8,000 molecular weight | 80 |
| 4 | Coating No. 1+3% Polyethylene 18,000–20,000 molecular weight | 75 |
| 5 | Coating No. 1+3% Polybutylene 12,000 molecular weight | 80 |

*Example VIII*

Paper cartons normally employed for milk, and others of the type used for cottage cheese and the like, were dipped in the waxes and wax compositions of this invention with and without the incorporation of polyethylene in the wax. The coating compositions were maintained at approximately 250° F. during the dipping operations. Following dipping the cartons were permitted to drain at ordinary temperatures. Cartons treated in the above manner were eminently satisfactory for their intended uses. The wax produced a smooth, semi-gloss surface and gave complete sealing. In order to determine water and/or acid penetration, the cartons were filled with 1% aqueous lactic acid containing methylene blue; the dye being added in order to facilitate the observation of absorption of liquid by the carton. After storage for ten days at ordinary temperatures, only very slight water penetration was observed.

The foregoing description of my invention is not to be taken as limiting my invention but only as illustrative

I claim:

1. A coating composition having a high sealing strength and being suitable for use in coating food wrapping paper and paper containers, said composition comprising a heart-cut paraffin wax having a melting point between about 150° F. and about 170° F. and containing less than about 1% of oil and between about 0.5% and about 5% by weight, based on the wax, of a polyolefin having an average molecular weight between about 8,000 and about 20,000, said heart-cut paraffin wax being prepared by topping a waxy crude oil to remove gas oil and lighter fractions, separating slack wax from the topped crude oil, deoiling and distilling said separated slack wax and in the distilling operation discarding the first 40% to 60% overhead and leaving between 5% and 30% as bottoms to obtain a heart-cut.

2. A composition according to claim 1 in which said slack wax is first deoiled and the deoiled wax is distilled to obtain the heart-cut.

3. A composition according to claim 1 in which said slack wax is first distilled to obtain a heart-cut and the heart-cut is deoiled.

4. A composition according to claim 1 in which said polyolefin is polyethylene.

5. A coating composition having a high sealing strength and being suitable for use in coating food wrapping paper and paper containers, said composition comprising a paraffin wax and between about 0.5% and about 5% by weight, based on the wax, of a polyethylene having an average molecular weight between about 8,000 and about 20,000, said paraffin wax having a melting point between 150° F. and 170° F. and being prepared by distilling slack wax to recover the 50% to 90% fraction and deoiling said fraction to produce a wax containing less than about 0.5% of oil.

6. A coating composition having a high sealing strength and being suitable for use in coating food wrapping paper and paper containers, said composition comprising a paraffin wax and about 0.5% to about 5% by weight, based on the wax, of a polyethylene having an average molecular weight of 12,000 to 13,000, said paraffin wax being obtained by fractionally distilling a slack wax recovered from a topped, solvent-treated waxy crude oil to obtain a distillate fraction within the range of 50% to 90% of the slack wax and deoiling said fraction of paraffin wax to produce a paraffin wax containing less than about 0.5% of oil.

7. A coating composition according to claim 6 in which the amount of polyethylene is about 3% by weight, based on the paraffin wax.

References Cited in the file of this patent

UNITED STATES PATENTS

| | | |
|---|---|---|
| 2,399,521 | Tyler | Apr. 30, 1946 |
| 2,467,959 | Bowman et al. | Apr. 19, 1949 |
| 2,670,318 | Halamka et al. | Feb. 23, 1954 |

FOREIGN PATENTS

| | | |
|---|---|---|
| 642,441 | Great Britain | Sept. 6, 1950 |
| 642,442 | Great Britain | Sept. 6, 1950 |

OTHER REFERENCES

Bennett's "Commercial Waxes," published by the Chemical Publishing Co. of Brooklyn, New York (1944), pages 8–10.